United States Patent [19]

Buxton et al.

[11] Patent Number: 4,683,099
[45] Date of Patent: Jul. 28, 1987

[54] MOULDING OF COMPOSITE MATERIALS

[75] Inventors: Frank A. Buxton; David J. Barraclough, both of Derby, England

[73] Assignee: Rolls-Royce plc, London, England

[21] Appl. No.: 831,490

[22] Filed: Feb. 20, 1986

[30] Foreign Application Priority Data

Apr. 2, 1985 [GB] United Kingdom ............... 8508580

[51] Int. Cl.⁴ .................. B29C 43/02; B29C 33/38
[52] U.S. Cl. .................... 264/511; 249/134; 264/102; 264/257; 264/258; 264/337
[58] Field of Search .......... 264/257, 258, 324, 314, 264/337, 331.16, 510, 511, 512, 102, 136, 137, 131; 249/134

[56] References Cited

U.S. PATENT DOCUMENTS

| | | | |
|---|---|---|---|
| 1,349,372 | 8/1920 | Egan | 264/258 |
| 1,504,547 | 8/1924 | Egerton | 264/258 |
| 2,923,978 | 2/1960 | Corzine | 264/314 |
| 3,341,646 | 9/1967 | Britain | 264/337 |
| 3,896,206 | 7/1975 | Beaver et al. | 264/258 |
| 4,062,917 | 12/1977 | Hill et al. | 264/257 |
| 4,126,659 | 11/1978 | Blod | 264/314 |
| 4,146,668 | 3/1979 | Dorey et al. | 264/258 |
| 4,271,116 | 6/1981 | Jones | 264/324 |
| 4,311,661 | 1/1982 | Palmer | 264/257 |

Primary Examiner—James Lowe
Attorney, Agent, or Firm—Cushman, Darby & Cushman

[57] ABSTRACT

A method of moulding composite materials in which prepregs of resin impregnated filaments are interposed between a shaped partially contained polytetrafluoroethylene body and a die. The assembly is heated to cause the polytetrafluoroethylene body to thermally expand and compress the prepregs against the die so that the prepregs are moulded to the shape of the die and the resin in the prepregs cures.

13 Claims, 2 Drawing Figures

1

MOULDING OF COMPOSITE MATERIALS

BACKGROUND OF THE INVENTION

This invention relates to the moulding of composite materials and in particular to the moulding of composite materials comprising reinforcing filaments enclosed in a resin matrix.

It is known to manufacture components by moulding composite materials using what is commonly known as the rubber expansion method. In one version of that method, layers of filaments which have been pre-impregnated with a resin binder are laid-up in a suitably shaped former and covered by an appropriately shaped silicone rubber member. The rubber member is covered in turn by a suitable rigid member so that as the whole assembly is heated, the silicone rubber expands to exert pressure upon the prepregs so that they conform to the shape of the former, consolidate and the resin, if it is a thermosetting resin, cures.

The silicone rubber expansion method of moulding is effective in the moulding of composite materials having a resin matrix material which flows and cures at temperatures around 200° C. However, if the resin matrix material flows and cures at higher temperatues, for instance temperatures of about 250° C. and upwards in the case of polyimides, the silicone rubber thermally degrades to such an extent that it is not re-usable.

It is an object of the present invention to provide a method of moulding composite materials in which the problems associated with expansion moulding utilizing silicone rubber at higher temperatures are substantially avoided.

SUMMARY OF THE INVENTION

According to the present invention, a method of moulding composite materials which composite materials comprise reinforcing filaments enclosed in a resin matrix comprises the subsequent steps of interposing a plurality of prepregs comprising resin impregnated filaments between a shaped, partially contained body, the major portion of which body is polytetrafluoroethylene, and means corresponding in shape with said shaped body which means is adapted to resist any force exerted thereon by said prepregs, and increasing the temperature of the resultant assembly to a level at which both said matrix resin and polytetrafluoroethylene are mobile, said shaped polytetrafluoroethylene body being so contained that the thermal expansion thereof upon said temperature increase is constrained to be generally in the direction of said prepregs so that said prepregs are compressed thereby against said resistance means and thereby consolidated and moulded to a shape corresponding generally with that defined by the original shape of said shaped body and said resistance means.

BRIEF DESCRIPTION OF THE DRAWINGS the invention will now be described, by way of example, with reference to the accompanying drawings in which.

DESCRIPTION OF THE PREFERRED EMBODIMENTS

Figure 1:
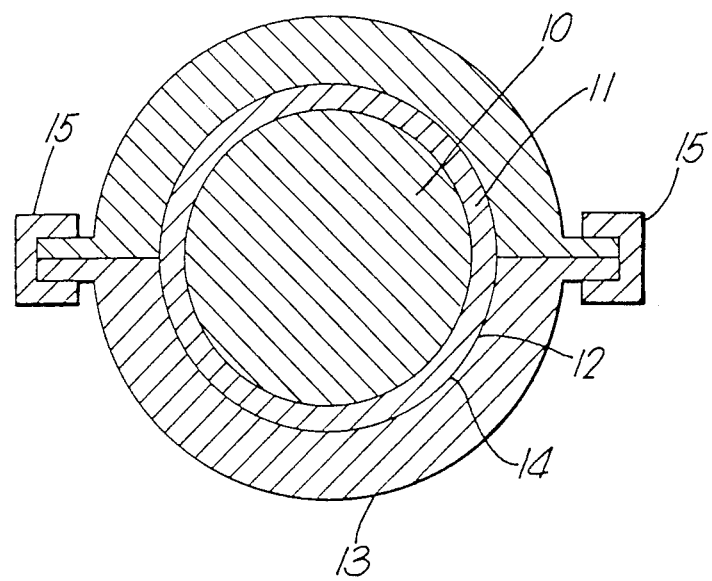
FIG. 1 is a cross-sectional view of apparatus for use in the method of the present invention.

With reference to FIG. 1, a cylindrical body 10 formed from polytetrafluoroethylene is sprayed with a conventional polytetrafluoroethylene-based release agent, although other suitable release materials could be used if desired, before being surrounded by a plurality of prepregs 11 which comprise uncured polyimide resin impregnated carbon filaments. The prepregs 11 may be conveniently wound around the body 10 if so desired. When the prepregs 11 have been laid-up upon the body 10, they are enclosed by a two-part steel die 13, the inner surface 14 of which has been sprayed with the same release agent. The die 13 inner surface 14 is of circular cross-section, engages the outer surface of the laid-up prepregs 11 and is coaxial with the longitudinal axis of the cylindrical body 10. Each part of the die 13 is flanged at its edges to receive u-shaped cross-section members 15 which serve to clamp the die parts 13 together. Blanking pieces (not shown) are finally fixed to the ends of the assembly so that the polytetrafluoroethylene body 10 is totally contained.

The assembly is then placed in a suitable oven and its temperature is slowly increased from room termperature to 205° C. As the temperature of the assembly rises, the polytetrafluoroethylene body 10 expands at a higher rate than of the steel die 13 so that the radial gap between them, which is occupied by the laid-up prepregs 11, decreases, thereby resulting in the compression of the prepregs 11.

The temperature of the assembly is held at 205° C. for two hours. This is done to ensure that any solvents within the prepregs 11 are released, the polytetrafluoroethylene body 10 fully soaks to 205° C. and that there is consolidation of the prepregs 11. The temperature of the assembly is then slowly increased to between 290° C. and 330° C. and is held at that temperature for one hour. By the time that the polytetrafluoroethylene body 10 has reached between 290° C. and 330° C. it has of course thermally expanded further so that the pressure which it exerts upon the prepregs 11 is correspondingly greater and consolidation of the prepregs 11 is completed. In addition it has softened to such an extent that it behaves as a fluid, thereby providing a substantially even pressure distribution over the prepreg 11 surface which it contacts. The holding of the assembly temperature for one hour additionally results in the curing of the polyimide resin in the prepregs 11. It will be understood however that the method of the present invention is not specifically restricted to thermosetting resins and that thermoplastic resins could be utilised if so desired and of course if they will withstand the high processing temperatures of the present invention (up to 330° C.). It will not of course by necessary with thermoplastic resins to allow time during the process to permit curing to take place.

After one hour at between 290° C., the temperature of the assembly is gradually reduced until its temperature has reached 60° C. The clamps 15 are then removed and the polytetrafluoroethylene body 10, which by this time has thermally contracted to a diameter less than the internal diameter of the consolidated and cured prepregs 11, is removed to leave a tube comprising reinforcing carbon filaments enclosed in a matrix of a cured polyimide resin.

In a variation upon the method of the present invention, a polytetrafluoroethylene body 16 shown in FIG.

2 which is of generally square cross-sectional shape, is placed upon a sheet 17 comprising carbon fibres in a cured polyimide resin matrix although an uncured resin matrix may be utilized if so desired. The polytetrafluoroethylene body 16 is then coated with a release agent before being covered by a plurality of prepregs 18 comprising uncured polyimide impregnated carbon filaments. The prepregs 18 are laid up on the polytetrafluoroethylene body 16 in such a manner that the end portions 19 of the prepregs 18 are in intimate contact with the surface of the sheet 17 upon which the polytetrafluoroethylene body 16 is placed. The prepregs 18 are in turn overlaid by layers 20 of porous release material and resin bleed material of the type conventionally used in vacuum moulding. Finally containment means (not shown) are attached to the ends of the polytetrafluoroethylene body 16 and the whole assembly of the polytetrafluoroethylene body 16, prepregs 18, and the release and bleed material layers 20 is covered by a sheet of impervious material 21. Clamping members 22 are located at the extents of the impervious material 21 to urge the sheet 21 into sealing engagement with the sheet 17 of cured polyimide resin impregnated carbon filaments. An aperture 22 is provided in the sheet of impervious material 21 which is in operation connected via an appropriate pipe (not shown) to an air pump to facilitate the evacuation of the volume enclosed by the sheet of impervious material 21.

Figure 2:
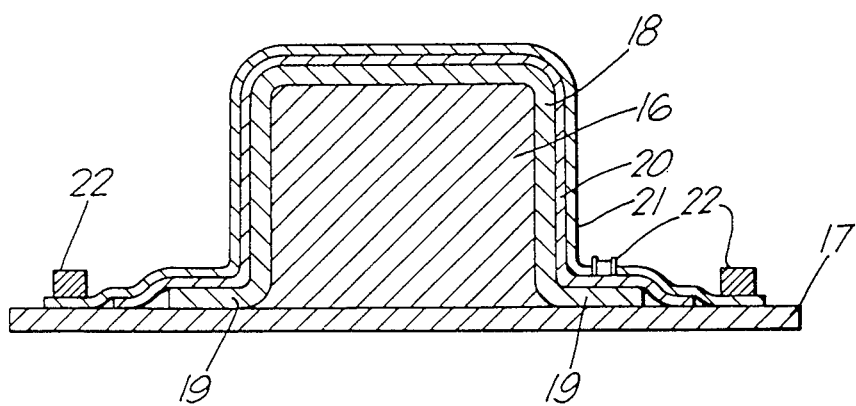
FIG. 2 is a cross-sectional view of an alternative form of apparatus for use in the method of the present invention.

The assembly depicted in FIG. 2 is then placed in an autoclave (not shown) which of course has facilities for the passage therefrom of the vacuum pipe connected to the aperture 22 in the sheet of impervious material 21. The volume enclosed by sheet of impervious material is then evacuated and the temperature within the autoclave slowly increases from room termperature to 205°. As in the previous embodiment, the temperature is held at 205° C. for two hours in order to permit the removal of solvents, temperature soaking and partial consolidation of the prepregs 20. The temperature is then slowly raised from 205° to between 290° C., and 330° C. However, when the temperature reaches 250° C., the pressure within the autoclave is increased from ambient to 200 pounds per square inch. The temperature is then held at between 290° C. and 330° C. for one hour in order to achieve complete consolidation, cure the polyimide resin in the prepregs 18 and the bonding of the prepregs 18 to the sheet 17. The temperature is then allowed to slowly fall to around 60° C. whereupon the autoclave pressure and the vacuum applied to the volume enclosed by the sheet of impervious material 21 are released.

The clamping members 22 are then removed together with the sheet of impervious material 21 and the release and bleed layers 20. Finally, the polytetrafluoroethylene body 16, which by this time has contracted to have a cross-sectional area which is less than that defined by the cured prepregs 18, is removed. The resultant structure comprises a sheet 17 of cured polyimide resin reinforced with carbon filaments which is stiffened by a square cross-sectioned member bonded thereto and also consisting of a cured polyimide resin matrix reinforced by carbon filaments.

In both of the above examples in accordance with the present invention, the body used to thermally expand and exert pressure on the laid-up prepregs is formed from pure polytetrafluoroethylene. It may be desirable in certain circumstances however to provide the polytetrafluoroethylene with a suitable filler material which is chemically inert with respect to polytetrafluoroethylene such as fibre-glass or bronze powder in order to tailor its expansion characteristics to the particular applications in which it is used as well as prevent creep and deformation thereof under load. Such modification may be readily determined by empirical means in each individual application of the present invention.

It will be seen therefore that polytetrafluoroethylene body provides advantages in thermal tolerance over the conventionally used silicone rubbers in the moulding of composite materials. It also has the additional advantage of being capable of being thermally formed into highly complicated shapes. This being so, it can be used in the process of vacuum bag moulding, as described above, or without the use of an autoclave to apply additional moulding pressure, to produce composite material parts of complex configuration without resorting to the use of complex dies in the moulding process.

Although the present invention has been described with reference to the moulding of prepregs which are impregnated with a polyimide resin, it will be appreciated that other thermosetting resins could be used, subject of course to their curing temperatures being conducive with the thermal characteristics of the polytetrafluoroethylene body used. Moreover it will be appreciated that the present invention is also applicable to the moulding of composite materials comprising reinforcing filaments enclosed in a matrix of thermoplastic resin. In such circumstances the moulding cycle would have to be suitably modified in order to take into account the fact that it would only be for the consolidation of the prepregs, not their curing.

We claim:

1. A method of moulding composite materials which composite materials comprise reinforcing filaments enclosed in a resin matrix, said method comprising:

interposing a plurality of prepregs comprising resin impregnated filaments between a shaped body and means corresponding in shape to said shaped body, wherein at least a major portion of said shaped body is polytetrafluoroethylene, and increasing the temperature of the resulting assembly to a temperature within the range of 290° C. and 330° C. so that the resultant thermal expansion of said shaped polytetrafluoroethylene body provides the compression of said prepregs between said shaped polytetrafluoroethylene body and said means corresponding in shape with said shaped body so that said prepregs are consolidated and moulded to a shape corresponding generally with that defined by said shaped polytetrafluoroethylene body.

2. A method of moulding a composite material as claimed in claim 1 wherein said resin is a thermosetting resin and the maximum temperature which is reached during said method is sufficiently high and is maintained for a sufficiently long period for said resin to cure.

3. A method of moulding a composite material as claimed in claim 1 wherein at least some of said prepregs are placed in intimate contact with previously moulded composite material comprising reinforcing filaments enclosed in a resin matrix in such a manner that said prepregs are bounded by the resin therein to said previously moulded composite material during the course of said moulding process.

4. A method of moulding a composite material as claimed in claim 1 wherein said means corresponding in shape with said shaped body comprises a shaped body which is in the form of a die.

5. A method of moulding a composite material as claimed in claim 1 wherein said means corresponding in shape with said shaped body comprises a vacuum bag moulding assembly which assumes the shape of said shaped body upon the evacuation thereof.

6. A method of moulding a composite material as claimed in claim 5 wherein additional pressure is exerted upon said vacuum bag moulding assembly after the evacuation thereof to augment the resistance of said vacuum bag moulding assembly to the pressure exerted thereon resulting from the thermal expansion of said shaped polytetrafluoroethylene body.

7. A method of moulding a composite material as claimed in claim 6 wherein said additional pressure is exerted by an autoclave.

8. A method of moulding a composite material as claimed in claim 1 wherein said polytetrafluoroethylene is intimately mixed with a filler material which filler material is chemically inert with respect to polytetrafluoroethylene.

9. A method of moulding a composite material as claimed in claim 8 wherein said filler material is glass-fibre or bronze powder.

10. A method of moulding a composite material as claimed in claim 1 wherein said filaments are of carbon.

11. A method of moulding a composite material as claimed in claim 2 wherein said thermosetting resin is a polyimide.

12. A method of moulding a composite material as claimed in claim 11 wherein the temperature of said assembly is slowly raised to a temperature of 205° C., said temperature of 205° C. being maintained for two hours whereupon the temperature is slowly increased to between 290° C. and 330° C. and held at that temperature for one hour whereupon the temperature is slowly reduced to 60° C.

13. A method of moulding a composite material as claimed in claim 6 wherein the pressure exerted by said autoclave is 200 pounds per square inch.

* * * * *